United States Patent [19]

Millay et al.

[11] Patent Number: 4,751,647
[45] Date of Patent: Jun. 14, 1988

[54] METHOD FOR DETERMINING TOOL SIZE AND FOR MACHINING

[75] Inventors: Lawrence I. Millay; Terry W. Priestley, both of Springfield, Vt.

[73] Assignee: Bryant Grinder Corporation, Springfield, Vt.

[21] Appl. No.: 911,535

[22] Filed: Sep. 25, 1986

[51] Int. Cl.⁴ .............................................. G06F 15/46
[52] U.S. Cl. .................................. 364/474; 51/165.71; 51/165.88
[58] Field of Search ............................... 364/167–171, 364/474, 475; 51/165.77, 165.87, 165.88, 165.71; 318/568, 571

[56] References Cited

U.S. PATENT DOCUMENTS

| | | | |
|---|---|---|---|
| 4,382,215 | 5/1983 | Barlow et al. | 364/474 |
| 4,400,118 | 8/1983 | Yamakage et al. | 364/474 |
| 4,419,612 | 12/1983 | Reda et al. | 318/571 |
| 4,490,946 | 1/1985 | Tsujiuchi et al. | 364/474 |
| 4,502,125 | 2/1985 | Yoneda et al. | 364/167 |
| 4,542,467 | 9/1985 | McMurtry | 364/474 |
| 4,636,960 | 1/1987 | McMurtry | 364/474 |

Primary Examiner—Jerry Smith
Assistant Examiner—Allen MacDonald
Attorney, Agent, or Firm—Edward J. Timmer

[57] ABSTRACT

The method involves moving a reference or dummy tool of known size on a toolhead slide from a known position to actuate a limit switch, moving a working tool of unknown size on the same toolhead slide from the same known position to again actuate the limit switch and comparing the toolhead slide position for actuating the limit switch for the working tool with the stored toolhead slide position for the reference tool to determine size of the former.

5 Claims, 2 Drawing Sheets

METHOD FOR DETERMINING TOOL SIZE AND FOR MACHINING

FIELD OF THE INVENTION

The invention relates to a method for monitoring or determining tool size and to a method of machining using different tools in succession during a machining run of multiple workparts.

BACKGROUND OF THE INVENTION

In operating grinding machines to grind multiple workparts in succession, the size of the grinding wheel changes during the grinding run or new grinding wheels must be used in succession to replace previously worn grinding wheels during the run. In either case, it is important that the machine control unit know the size of the grinding wheel during the grinding run to make sure all moves of the grinding wheel are clear and will not hit other objects on the machine such as the wheel dresser or other workparts, to dress off approximately the correct amount when the wheel is brought to the dresser, to grind off approximately the correct amount in the event the wheel is brought to the workpart without first having been brought to the dresser and to command the wheel motor to run at the proper RPM for the desired surface speed of the wheel.

The computer control unit of flexible grinding centers having an automatic grinding wheel changer which mounts new wheels in succession as they are needed for a particular grinding operation or to replace a previously worn wheel require knowledge of the size of the grinding wheels for the above-stated reasons.

SUMMARY OF THE INVENTION

The invention contemplates a method for determining the size of a grinding wheel or other tool by moving a dummy or reference tool member of known size on a toolhead slide from a known position in a direction to actuate a suitable position sensor, storing the position of the toolhead slide for sensor actuation by the dummy tool, moving a working tool of unknown size similarly to again actuate the sensor and then comparing the position of the toolhead slide for the working tool to the stored position for the dummy tool to determine the size of the working tool. Relative movement between the dummy or working tool and sensor may be employed.

The invention contemplates a method for machining using different tools in succession wherein the size of each new tool is determined by the method of the preceding paragraph and wherein workparts are machined only after the size of each new tool has been determined.

DESCRIPTION OF PREFERRED EMBODIMENTS

Figure 1:
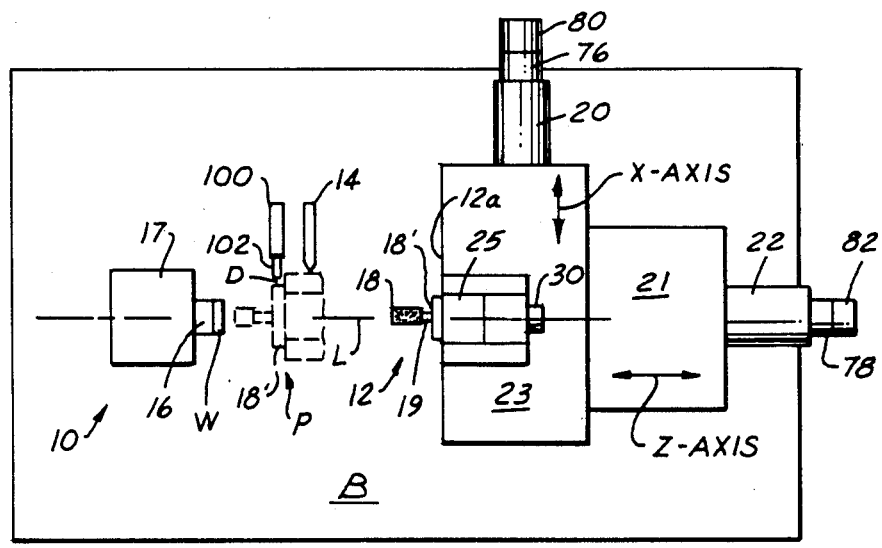
FIG. 1 is a schematic illustration of a grinding machine for practicing the invention wherein the dummy wheel or disc is used to establish a stored gage position for the X-slide.

FIG. 1 illustrates schematically a grinding machine with a workhead 10, wheelhead 12 and wheel dresser 14 for use in practicing the method of the invention. The workhead 10, wheelhead 12 and dresser 14 can be of conventional construction.

As is well known, the workpart W is chucked in the chuck 16 of the workhead and is rotated by the workhead spindle 17 during grinding but at a lesser speed of revolution than the cylindrical real or working grinding wheel 18 is rotated by spindle 19 of the wheelhead motor 25. The grinding wheel can be of the superabrasive type; e.g., cubic boron nitride or diamond, or other types, and is reciprocated axially or simply plunged inside the bore of the chucked workpart while being radially fed or fed in the X-axis direction against the bore wall in grinding relation at appropriate radial infeed rates for rough grinding and finish grinding. Reciprocating movement (if used) of the grinding wheel in the workpart bore is effected by a so-called Z-axis slide 21 which moves back and forth in the Z direction and radial infeeding of the wheel against the bore wall is effected by a so-called X-axis slide 23 movable in the X-direction, all as is well known, for example, as shown in the Reda et al U.S. Pat. No. 4,419,612 issued Dec. 6, 1983, the teachings of which are incorporated herein by reference.

Figure 3:
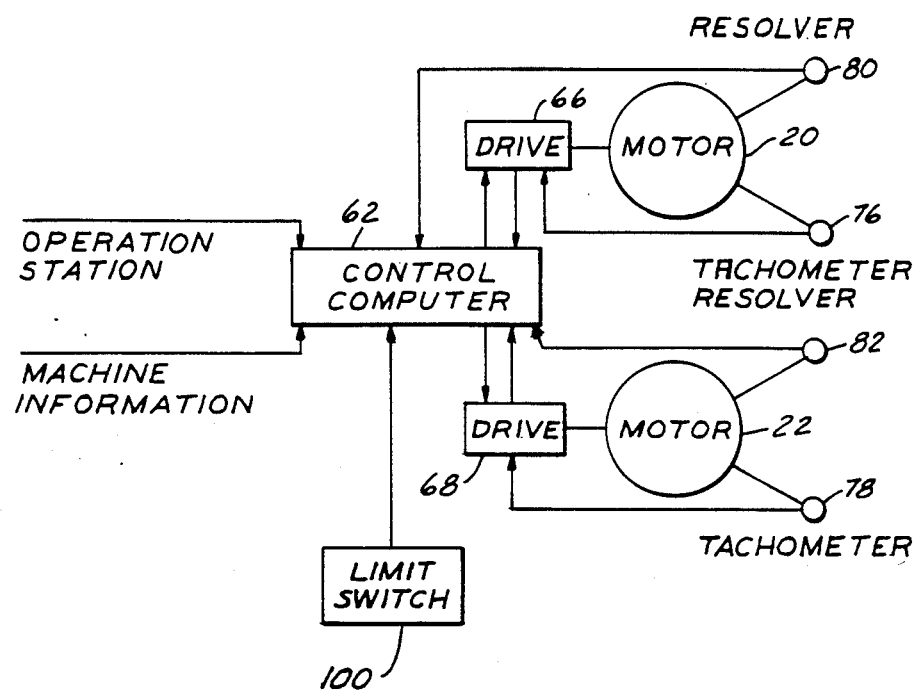
FIG. 3 is a block diagram of an exemplary machine control system for carrying out the methods of the invention.

FIG. 3 is a block diagram of the control system employed to control movements of the Z-axis and X-axis slides 21 and 23 on which the wheelhead 12 is carried. The numeral 62 generally designates a control computer which is programmed to control all machine functions and interlocks. Such functions include lubrication status, safety interlocks, motor status and operation control station information. The control computer 62 may be any suitable digital computer or micro-processor. The control computer 62 has stored the positions and rates for all the axis moves for the various sequences which may include a grind cycle, dress cycle and so forth. The control computer 62 sends servo drive signals to the servo drive means 66 and 68 for controlling the servo motors 20,22 with respect to the respective X-axis and Z-axis slides to cause the grinding wheel to move as desired. The servo drive means 66,68 take feedback from the tachometers 76,78, respectively. The numerals 80,82 designate either resolvers, encoders or "INDUCTOSYN" transducers and they provide feedback signals directly to the control computer 62 or to the respective drive means 66,68, depending upon the type of servo drive means used, in closed servo loop manner with the tachometers.

A suitable control computer 62 is available on the market from Intel Corp. of Santa Clara, CA 95054 and sold under the name of "INTEL" (a trademark) 86/05 Single Board Computer. The servo drive means 66,68 may be any suitable servo drive means as, for example, a servo drive available on the market from Hyper Loop, Inc. of 7459 W. 79 Street, Bridgeview, IL 60455 under the trademark "HYAMP". The HYAMP servo drive is a single phase, full wave, bi-directional SCR servo drive for D.C. motors and it provides D.C. drive power for precise speed control and regulation over a wide speed range. Another suitable servo drive designated as Size 50 is available from General Electric Co., 685 West Rio Road, Charlottsville, VA 22906. More preferred servo drive means are available from Inland Industrial Drives Div., Kollmorgen Corp., 201 Rock Road, Redford, Va., e.g., Model SP/R-X-1152.

The servo motors 20,22 may be any suitable D.C. servo motor. Suitable D.C. servo motors of this type are available from Torque Systems, Inc., 225 Crescent Street, Waltham, MA 02154 under the trademark "SNAPPER" and identified as frame sizes 3435 and 5115. A larger motor of this type is also available from the H. K. Porter Co., 301 Porter Street, Pittsburg, PA 15219. More preferred D.C. servo motors are available from Inland Industrial Drives Div., Kollmorgen Corp., 201 Rock Road, Redford, Va.

The tachometers 76,78 are part of the D.C. servo motors. The resolvers, encoders or INDUCTOSYN transducer 80,82 are commercially available items and may be any suitable conventional position feedback devices available on the market. Resolvers of this type are available from the Clifton Precision Company of Clifton Heights, PA 19018. INDUCTOSYN precision linear and rotary position transducers are available from Farrand Controls, a division of Farrand Industries, Inc., 99 Wall Street, Valhalla, NY 10595. A suitable optical shaft angle encoder designated as Model No. DRC-35 is available from Dynamics Research Corp., 60 Concord Street, Wilmington, MA 01887.

The Z-axis and X-axis slides 21,23 are driven and controlled by the control system described above by a conventional ball screw (not shown), Acme screw or other screw means rotated by servo motors 22,20 as explained in U.S. Pat. No. 4,419,612 issued Dec. 6, 1983 of common assignee, the teachings of which are incorporated herein by reference.

Figure 2:
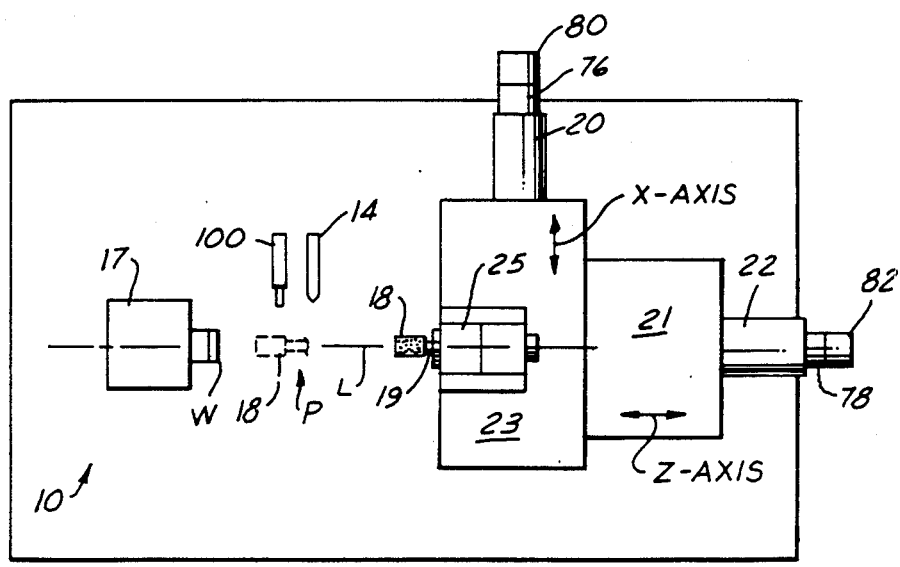
FIG. 2 is a view similar to FIG. 1 wherein a real working grinding wheel is positioned to determine its size.

Referring to FIGS. 1 and 2, a conventional limit switch 100 having a spring loaded plunger 102 is shown mounted in fixed position on the bed B of the machine for practicing the invention. In lieu of the limit switch, other position sensors or transducers may be used, for example, contact and non-contract transducers such as eddy current, ultrasonic, optical, air pressure jet, coolant jet, strain gage, LVDT, and potentiometer devices could be used.

In practicing the method of the invention, a dummy or reference grinding wheel or member in the form of a cylindrical disc 18′ is positioned around spindle 19 on the front face or flange 12a of the wheelhead 12. The size or outer diameter of the dummy grinding wheel is calibrated and known. Of course, instead of cylindrical disc 18′, a dummy or reference grinding wheel like actual wheel 18 and of known size could be mounted on spindle 19 for purposes of practicing the invention. And, the method can be used not only with a cylindrical wheel or disc shape but also other shapes having rotational symmetry such as conical or truncated conical wheel or disc shapes.

The Z-axis slide 21 is then actuated to bring the dummy disc or wheel 18′ forward to a pre-selected known start or reference position P (shown in phantom) along the Z-axis spaced opposite or adjacent the tip of plunger 102, FIG. 1, a selected distance D in the X-axis direction. Then, the X-axis slide 23 is actuated to move the dummy disc or grinding wheel from the known position P toward the tip of plunger 102. Movement in the X-axis direction is continued until the dummy disc or wheel depresses the plunger 102 sufficiently to close the limit switch 100. Switch closing effects through the control computer 62 reversal in the direction of X-axis slide 23 back toward position P and slowing in speed of slide travel. Upon switch opening as a result of reverse X-axis slide movement and via input of an "open switch" signal to control computer 62 controlling X-axis motor 20, resolver 80 provides an X-axis gage position signal to control computer 62 which signal is stored in the memory of the computer.

The above steps are used to set up the grinding machine prior to actual grinding using the real or working grinding wheel 18.

Prior to grinding of workparts using the wheel 18, the actual size of wheel 18 must be determined by the control computer 62 as follows. The control computer moves the working grinding wheel 18 placed on spindle 19 to the pre-selected known start position P (same position P as used for the dummy disc) along the Z-axis by Z-axis slide movement (slide 21). The same start position P along the Z-axis is used from one wheel to the next to insure contact with plunger 102 at the same small area or point on each wheel. This is especially important for conical or tapered wheels. Then, the control computer actuates the X-axis slide drive motor 20 to move the X-axis slide 23 and wheel 18 toward the tip of plunger 102 from position P. Movement of wheel 18 is continued until wheel 18 depresses plunger 102 to close limit switch 100 which again reverses the direction and speed of movement of the X-axis slide. Upon switch opening as a result of reverse X-axis slide movement and via input of the open switch signal to control computer 62 controlling motor 20, resolver 80 provides an X-axis gage position signal for wheel 18 to control computer 62 and the control computer stores the X-axis gage position signal supplied by resolver 80 for wheel 18. The control computer then may optionally direct rotation of wheel 18 at position P to sample another region thereof and repeats movements from position P relative to the plunger and stores a second X-axis gage position for the rotated wheel 18. This wheel sampling may be repeated several times if desired. If the two stored X-axis gage positions for wheel 18 differ by more than 0.002 inch, the control computer requests the operator to correct the discrepancy or, in the case of a new undressed wheel, to accept the discrepancy. Then the control computer compares the smaller of the one or more stored X-axis gage positions for wheel 18 with the previously stored X-axis gage position for the dummy disc or wheel 18′ and determines the size of wheel 18 using an appropriate algorithm input therein relating X-axis position of the wheel relative to the centerline or axis L of start position P to the outer diameter of the dummy or working grinding disc or wheel being gaged.

An algorithm for use in the size determination calculation is as follows:

wheel diameter = dummy diameter + 2 times (X-axis gage position for dummy 18′ −

X-axis gage position for working wheel 18)

Only after the control computer 62 has determined the size of the working grinding wheel 18 in this manner will actual grinding of workparts W in succession be permitted.

The step of moving the grinding wheel from start position P to first close limit switch 100 and then to open limit switch 100 for determining size of the working grinding wheel will be repeated whenever another working wheel 18 is substituted in succession for wheel 18 as a result of the latter being worn or otherwise in need of replacement. It will also be repeated at any time when the machine has been inactive for more than some predetermined duration. After the size determination has been carried out, the control computer can then adjust slide position for proper wheel dress, back off and other motions.

During the size determination sequence described hereinabove, the dummy disc or wheel and working grinding wheel 18 are not rotated except when the wheel is moved from limit switch 100 to sample another region of the wheel. They are rotated only during actual grinding of workparts subsequent to the size determination sequence. However, if a non-contacting type of transducer is used, or even certain types of contacting transducers, rotation during size determination may be possible.

Although certain preferred features and embodiments of the invention have been described hereinabove and illustrated in the Figures, it is to be understood that modifications and changes may be made therein without departing from the spirit and scope of the invention as defined in the appended claims.

We claim:

1. A method for determining the size of a grinding wheel having rotational symmetry carried on a wheelhead slide comprising:
   (a) moving the wheelhead slide with a dummy wheel of known size from a known position in a direction to actuate a position sensor,
   (b) storing the position of the wheelhead slide where the sensor is actuated by the dummy wheel,
   (c) moving the wheelhead slide with a working grinding wheel of unknown size thereon from the known position in said direction to actuate said sensor, and
   (d) comparing the position of the wheelhead slide to actuate the sensor in step (c) with the stored position of the wheelhead slide in step (b) to determine the size of the working grinding wheel.

2. The method of claim 1 including moving the wheelhead slide in steps (a) and (c) to actuate a limit switch as the sensor.

3. The method of claim 1 including, in steps (a) and (c), holding the dummy wheel and working grinding wheel, respectively, on the wheelhead slide without continuous rotation thereof.

4. The method of claim 1 including repeating steps (c) and (d) for the working grinding wheel after rotation thereof to sample different regions of the wheel and in step (d) one of the stored positions of the wheel is compared with the stored position from step (b).

5. In a method of grinding wherein different grinding wheels having rotational symmetry are used successively, the steps of:
   (a) initially moving a dummy wheel of known size mounted on a wheelhead slide from a known position in a direction to actuate a position sensor,
   (b) storing the position of the wheelhead slide where the sensor is actuated by the dummy wheel,
   (c) then moving each new working grinding wheel of unknown size after mounting on the wheelhead slide from the known position in said direction to actuate said sensor,
   (d) determining the size of each new working grinding wheel by comparing the position of the wheelhead slide in step (c) with the stored position of the wheelhead slide in step (b), and
   (e) grinding workparts with each new working grinding wheel only after its size has been determined.

* * * * *